United States Patent
Schubert

(10) Patent No.: US 8,691,115 B2
(45) Date of Patent: Apr. 8, 2014

(54) SYSTEM AND METHOD FOR CONTROLLING CHAR IN BIOMASS REACTORS

(75) Inventor: Peter James Schubert, Naperville, IL (US)

(73) Assignee: Indiana University Research and Technology Corporation, Indianapolis, IN (US)

( * ) Notice: Subject to any disclaimer, the term of this patent is extended or adjusted under 35 U.S.C. 154(b) by 243 days.

(21) Appl. No.: 13/097,852

(22) Filed: Apr. 29, 2011

(65) Prior Publication Data

US 2011/0266500 A1 Nov. 3, 2011

Related U.S. Application Data

(60) Provisional application No. 61/343,423, filed on Apr. 29, 2010.

(51) Int. Cl.
*B01J 7/00* (2006.01)

(52) U.S. Cl.
USPC ............... 252/373; 48/61; 48/197 R; 422/108

(58) Field of Classification Search
USPC ............ 252/373; 48/61, 197 R; 422/105, 108
See application file for complete search history.

(56) References Cited

U.S. PATENT DOCUMENTS

| | | | | |
|---|---|---|---|---|
| 4,497,637 A | * | 2/1985 | Purdy et al. | 48/111 |
| 6,133,328 A | * | 10/2000 | Lightner | 518/700 |
| 8,168,144 B2 | * | 5/2012 | Alyaser | 422/630 |
| 8,585,789 B2 | * | 11/2013 | Sutradhar et al. | 48/197 R |
| 2007/0131909 A1 | * | 6/2007 | Rojey et al. | 252/373 |
| 2008/0149896 A1 | * | 6/2008 | Lenglet | 252/373 |
| 2010/0132633 A1 | * | 6/2010 | Liu et al. | 123/3 |
| 2010/0275514 A1 | | 11/2010 | Paganessi et al. | |
| 2010/0283009 A1 | * | 11/2010 | Nickels et al. | 252/373 |
| 2010/0301273 A1 | * | 12/2010 | Blasiak et al. | 252/373 |
| 2011/0036013 A1 | * | 2/2011 | Pavone et al. | 48/210 |
| 2011/0094158 A1 | | 4/2011 | Schubert | |
| 2011/0155958 A1 | * | 6/2011 | Winter et al. | 252/373 |
| 2011/0248218 A1 | * | 10/2011 | Sutradhar et al. | 252/373 |
| 2011/0250661 A1 | * | 10/2011 | Sutradhar et al. | 435/157 |
| 2011/0250662 A1 | * | 10/2011 | Sutradhar et al. | 435/157 |
| 2011/0314736 A1 | * | 12/2011 | Crespin | 48/202 |
| 2012/0025141 A1 | * | 2/2012 | Zhang et al. | 252/373 |
| 2012/0080647 A1 | * | 4/2012 | Zhao et al. | 252/373 |

* cited by examiner

*Primary Examiner* — Wayne Langel
(74) *Attorney, Agent, or Firm* — Hartman Global IP Law; Gary M. Hartmn; Domenica N. S. Hartman

(57) ABSTRACT

A system and process for modulating the carbon content of ash produced by a biomass gasification process, for example, to selected levels chosen by an operator, through the controlled injection of steam and controlled introduction of warm air during processing of a biomass feedstock. The system and process include delivering a carbon-containing biomass feedstock to a gasification reactor and producing a syngas and an ash from the biomass feedstock, and regulating the carbon content of the ash between a level at which carbon not present in the ash and a second level at which carbon is present in the ash. The regulating step entails selectively decreasing the moisture level of the biomass feedstock prior to the biomass feedstock being delivered to the gasification reactor and thereby increasing the carbon content of the ash, or increasing a moisture level of a mixture of the biomass feedstock, ash and gases within the gasification reactor and thereby decrease the carbon content of the ash.

18 Claims, 4 Drawing Sheets

SYSTEM AND METHOD FOR CONTROLLING CHAR IN BIOMASS REACTORS

CROSS REFERENCE TO RELATED APPLICATIONS

This application claims the benefit of U.S. Provisional Application No. 61/343,423, filed Apr. 29, 2010, the contents of which are incorporated herein by reference.

BACKGROUND OF THE INVENTION

The present invention generally relates to the conversion of organic lignocellulosic materials (biomass) into useful fuels (biofuels), and more particularly to a system and process capable of controlling the production, including the elimination, of carbon char in the ash produced by a biomass gasification or pyrolysis reactor.

Synthesis gas (syngas) is a gas mixture containing carbon monoxide (CO) and hydrogen gas ($H_2$) produced by the thermochemical conversion of carbonaceous materials, such as coal, petroleum, and biomass materials. Though having a lower energy density than natural gas, syngas is suitable for use as a fuel source for a variety of applications, including but not limited to gas turbines and automotive internal combustion engines. Syngas can also be used to produce methanol and hydrogen, or converted via the Fischer-Tropsch process to produce a synthetic petroleum substitute.

The use of syngas as a fuel is more efficient than direct combustion of the original biomass because more of the energy contained in the biomass is extracted by the conversion process, known as gasification. Within a typical biomass gasifier, a carbonaceous material is combusted in an atmosphere where the oxygen content is below the stoichiometric limit at which complete combustion can occur. This oxygen-starved combustion of carbonaceous material releases volatiles and heat. In the case of dry feedstock, the oxygen-starved combustion also produces an ash that has a carbon-rich content, referred to as char or, more recently, biochar. The combustion heat raises the temperature of the non-combusted carbonaceous material within the ash, causing it to pyrolyze and release flammable volatiles such as carbon monoxide (CO) and hydrogen ($H_2$). Steam ($H_2O$) may be injected to react with the char to produce more CO and $H_2$. Depending on process temperatures, methane ($CH_4$) and hydrocarbon molecules having a greater number of carbon atoms may also be produced. Consequently, biomass gasification processes employ substoichiometric quantities of oxygen or air to combust a portion of the biomass and through pyrolysis, and the optional injection of steam, produce heat (energy) and a syngas that contains a blend of flammable volatiles.

Plant biomass is composed largely of carbon and oxygen, with smaller amounts of hydrogen. As noted above, when dry feedstock materials of plant biomass are gasified, there is an excess of carbon and the resulting char causes the ash to have a darker appearance (black ash). On the other hand, moist plant biomass contains relatively greater amounts of hydrogen and oxygen, with the result that the gasification consumes essentially all the carbon of a moist biomass, and the resulting ash has a white/gray appearance. The syngas produced by gasifying a moist biomass will also contain a component of water vapor, which generally must be removed. Depending on the particular application, it may be more desirable to favor the production of syngas (with the result that a white/gray ash is produced) or the production of char (a black ash that contains excess carbon), in which case it may be desirable to control the carbon content of the char to levels favorable for ash post-processing.

Control systems adapted for use in biomass gasification processes are well known. As reported in U.S. Published Patent Application 2010/0275514 and U.S. patent application Ser. No. 12/760,241 (filed Apr. 14, 2010), such systems are often closed loop systems that use feedback control that rely on the outputs of various measurement devices.

BRIEF DESCRIPTION OF THE INVENTION

The present invention provides a system and process adapted to modulate the carbon content of ash produced by a biomass gasification process, for example, to selected levels chosen by an operator, through the controlled injection of steam and controlled introduction of warm air during processing of a biomass feedstock.

According to a first aspect of the invention, the system includes a receptacle adapted to receive a carbon-containing biomass feedstock, and a gasification reactor adapted to receive the biomass feedstock from the receptacle and produce a syngas from the biomass feedstock. The gasification reactor comprises an inlet for the biomass feedstock, a syngas outlet for the syngas produced from the biomass feedstock, and an ash outlet for an ash that forms as the syngas is produced from the biomass feedstock. Means is provided for decreasing a moisture level of the biomass feedstock prior to the biomass feedstock being received by the gasification reactor from the receptacle so as to increase a carbon content of the ash. Means is further provided for increasing a moisture level of a mixture of the biomass feedstock, the ash and gases while the biomass feedstock and the ash are within the gasification reactor so as to promote conversion of carbon in the biomass feedstock to a carbon-containing gas component of the syngas and decrease the carbon content of the ash. Means is provided for controlling the decreasing and increasing means to regulate the carbon content of the ash between a level at which carbon is not present in the ash and a second level at which carbon is present in the ash.

According to a second aspect of the invention, the process includes containing a carbon-containing biomass feedstock in a receptacle, delivering the biomass feedstock to a gasification reactor and producing a syngas and an ash from the biomass feedstock, and regulating a carbon content of the ash between a level at which carbon is not present in the ash and a second level at which carbon is present in the ash. The regulating step entails selectively decreasing a moisture level of the biomass feedstock prior to the biomass feedstock being delivered to the gasification reactor and thereby increasing the carbon content of the ash, or increasing a moisture level of a mixture of the biomass feedstock, the ash and gases while the biomass feedstock and the ash are within the gasification reactor so as to promote conversion of carbon in the biomass feedstock and the ash to a carbon-containing gas component of the syngas and thereby decrease the carbon content of the ash.

A technical effect of the invention is the ability to control the carbon content (char) of a biomass ash to specific levels, including the ability to essentially or completely eliminate carbon from the biomass ash. As such, the invention is capable of controlling the carbon content to achieve a range of tradeoffs between maximum syngas production efficiency (achieved if the feedstock contains sufficient moisture so that all carbon is converted and a white/gray ash is produced) and maximum char production (achieved if the feedstock is sufficiently dry so that not all carbon is converted and a black ash is produced). In between these extremes lies an interesting region where an appropriate balance of char content provides special advantages in post-processing of the ash, for example, to produce elemental silicon. The present invention provides the flexibility to optimize a gasification operation for any of these purposes. Advantageously, the system and process can be adapted as a stand-alone application, or can be adapted for use with an existing gasification or pyrolysis reactor.

Other aspects and advantages of this invention will be better appreciated from the following detailed description.

DETAILED DESCRIPTION OF THE INVENTION

Biomass materials obtained from plant sources typically contain of cellulose, hemicellulose, lignin, along with trace compounds or elements such as silicon, potassium, phosphorus, and sulfur. On an elemental basis, the primary component of biomass is carbon, typically at a level of up to 25 weight percent if the biomass is primarily or entirely plant materials, though carbon contents of up to 50 weight percent are possible if the biomass is derived from plastic materials. The natural state of biomass when collected is typically dry, as is the case with corn stover, wheat straw, rice husks, and seasoned wood. However, rain during harvesting, or collection of green wood or nuisance plants, means the moisture content of the biomass may take on a wide range of values. The moisture content of biomass is typically given as a weight percentage. In the case of corn stover, the initial moisture content may range from about 3% to as high as 60% water by weight.

As previously noted, gasification and pyrolysis are methods by which biomass is heated to produce a flammable gas referred to as syngas (synthetic or synthesis gas). Syngas is typically a mixture of carbon monoxide (CO) and hydrogen ($H_2$), and may further contain methane ($CH_4$) and/or hydrocarbon molecules having more than one carbon atom. Syngas often has other components, such as carbon dioxide ($CO_2$), water vapor ($H_2O$), and nitrogen ($N_2$). Syngas may be used as a fuel for a prime mover, or as feedstock to produce further chemicals of value.

When syngas is produced, the non-volatile components of the plant biomass remain as ash in the gasification/pyrolysis reactor. The primary constituent of ash is silica ($SiO_2$), with oxides of K and P as lesser constituents, which confer a light gray color to the ash. Depending on the feedstock moisture content and the gasifiery/pyrolysis configuration, the ash may also include carbon, which if present in sufficient amounts confers a black color to the ash. Carbon-rich ashes are often referred to as "biochar," and have been touted as a form of carbon sequestration. Biochar is biologically inactive and, as a result, is capable of remaining unchanged for very long periods of time, even thousands of years. In addition to this beneficial property, biochar has become highly valued as a product for soil augmentation.

Figure 1:
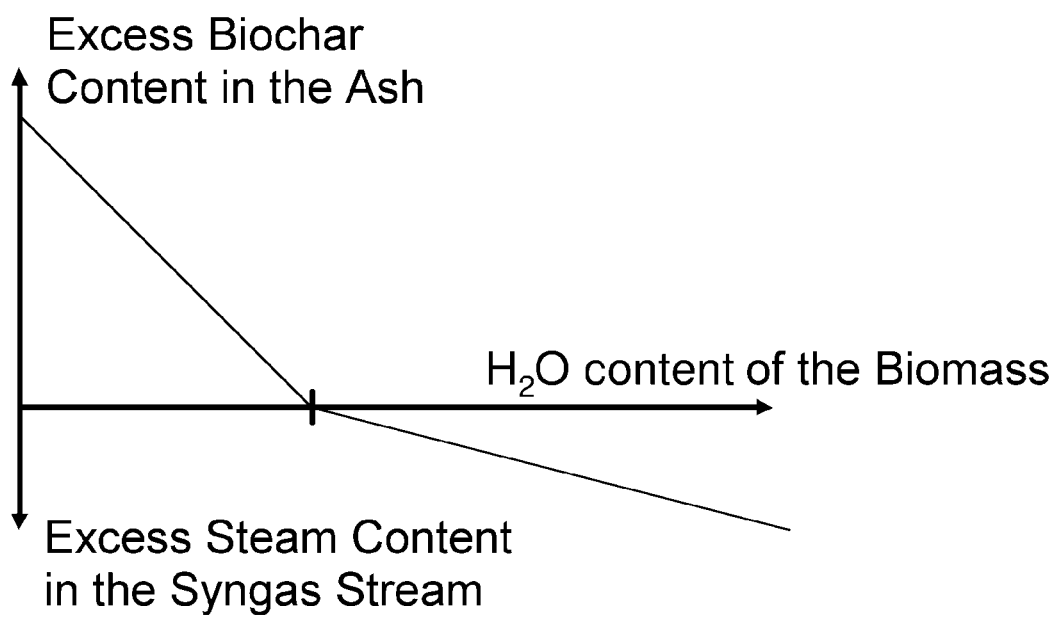
FIG. 1 is graph representing the effect that moisture content of a biomass has on the amount of biochar and steam produced by a biomass gasification process.

The amount of biochar produced in a gasifier/pyrolysis reactor depends on the relative amounts of C, O, and H. Whereas dry biomass has an excess of C and, when gasified, produces a biochar-rich black ash, wet biomass has an excess of H and, when gasified, more C is converted to gaseous CO, a biochar-lean white/gray ash is produced, and an excess amount of water vapor ($H_2O$) is present in the syngas stream. As represented in FIG. 1, the point at which the production of carbon and steam balance is the stoichiometric point, and is typically in the range of 15% to 30% moisture.

The means by which biochar (C) is converted to syngas is described by the so-called "water gas shift" reaction, shown in equation [1].

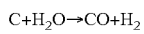

$$C+H_2O \rightarrow CO+H_2 \qquad [1]$$

Thus, by introducing water either into the biomass or into the reactor, the biochar can be converted to syngas (CO and $H_2$). According to a preferred aspect of the invention, the carbon content of an ash produced by a gasification/pyrolysis process is modulated by either injecting steam into the reactor to promote the production of syngas and consequently a carbon-lean or substantially carbon-free ash (for example, a carbon content of less than 1 weight percent in the ash), or by drying the feedstock with waste heat to promote the production of biochar (for example, a carbon content in the ash of at least 25 weight percent and possibly as high as 50 weight percent or more). An advantageous aspect of the former is the ability to maximize the production of syngas limited only by the original carbon content of the particular biomass material being processed, whereas an advantageous aspect of the latter is the ability to produce larger amounts of biochar as a valuable byproduct of the gasification/pyrolysis process. A wide range of carbon contents between these extremes can also be achieved by suitably setting a feedback control setpoint, as described below. As an example, the process can be used to produce an ash that is particularly suitable as a source for elemental silicon. To produce pure silicon from a silica-containing and carbon-containing ash, silicon and carbon are preferably present in the ash at a ratio of about 1:1, or about 50 weight percent carbon. The carbon and silicon contents of biomass feedstock obtained from typical plant materials are, respectively, about 30% and about 5% by weight. Therefore, to produce an ash from this material that will contain roughly equal amounts of carbon and silicon, the original carbon (char) content of the biomass would be reduced to about ⅙ of its original level to achieve a carbon content in the biomass of about 5 weight percent, or roughly equal that of the silicon content in the biomass and ash.

Figure 2:
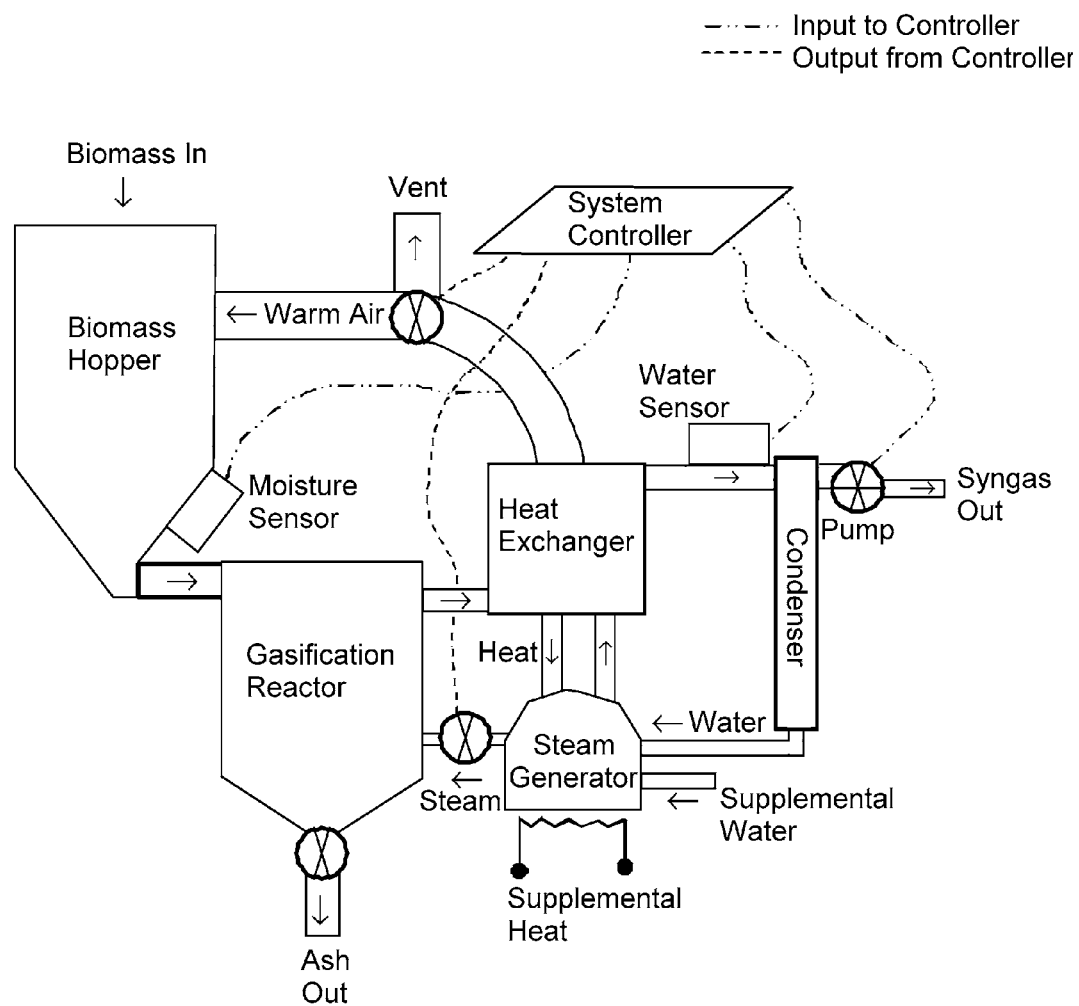
FIG. 2 schematically represents a biomass reactor system adapted to control the biochar (carbon) content of ash produced by the system in accordance with an embodiment of the present invention.

FIG. 2 schematically represents a biomass reactor system adapted to control the biochar (carbon) content of ash produced by the system in accordance with an embodiment of the present invention. The essence of the system of FIG. 2 is to control the carbon content in the ash by coordinating the control of steam injection into the gasification reactor to promote the conversion of carbon in the biomass feedstock to carbon-containing gas components of syngas (and thereby reduce the carbon content of the ash) and the control of warm air injection into the biomass feedstock prior to entering the gasification reactor to reduce the conversion of carbon in the biomass feedstock to carbon-containing gas components of syngas (and thereby increase the carbon content of the ash). Steam is generated within a steam generator by heating water that can be drawn from a condenser (used to cool the syngas produced by the system) and/or drawn from a supplemental water source. The water can be heated with heat extracted with a heat exchanger from the syngas drawn from the gasification reactor, and/or with supplemental heat applied to the steam generator, for example, with a resistance heater. In this manner, the carbon content in the reactor ash can be controlled by appropriately monitoring and controlling process variables, for example, the moisture content of the biomass using of one or more "moisture sensors" and the water content of the syngas using of one or more "water sensors."

The system represented in FIG. 2 can operated in the following manner. A suitable biomass (plant feedstock material) is introduced into a receptacle (biomass hopper) and its moisture content is measured, for example, using a resistive or capacitive moisture sensor of a type known in the art. The measured value of the moisture content is provided as an input to a system controller. The biomass is metered into the gasification (pyrolysis) reactor, where the biomass is volatilized into syngas and ash is produced. The ash is essentially a mineral ash that contains carbon, the amount of which depends on the moisture content of the biomass and the amount of steam injected into the gasification reactor from the steam generator.

The hot syngas leaving the gasification reactor passes through the heat exchanger, for example, a forced-air, cross-current apparatus of a type known to those skilled in the art. The syngas is cooled within the heat exchanger, while the air used to cool the gas is heated within the heat exchanger. A valve, such as a variable control valve, can be used to vent the warmed air to atmosphere (or a downstream application) or introduce the warmed air into the biomass hopper. When introduced into the hopper, the warm air serves to dry the biomass within the hopper, in other words, its moisture content is reduced. Optionally, agitation, mixing, and/or aeration equipment (not shown) can be used to promote the distribution of the warm air throughout the biomass within the hopper. Such equipment and techniques are well known and, depending on the particular type of feedstock, may be interchangeably used. The system controller utilizes the output of the moisture sensor to control the valve and thereby control the moisture content of the biomass within the hopper. This information, along with a suitable control algorithm (described below) allows the controller to reduce the biomass moisture content, if so desired. As will be described below, the heat exchanger, which may comprise multiple heat exchanger subsystems, can also be operated to provide heat to the steam generator.

The moisture (water vapor) content of the cooled syngas exiting the heat exchanger is measured with the water sensor prior to entering a pump, which may be of any suitable type, including a variable-speed pump. The differential pressure across the inlet and outlet of the pump, together with a calibrated flow rate of the pump, can be used to monitor the flow rate of the syngas. Alternatively or in addition, a dedicated mass flow meter may be used to measure the syngas mass flow rate. Together, the water vapor content and the mass flow rate of the syngas can be used to determine the relative amount of water in the syngas. This information can then be provided as an input to the controller for use in the aforementioned control algorithm.

It is typically desirable to produce a dry syngas for use in a downstream process or application, as nonlimiting examples, a gas turbine or an automotive internal combustion engine. The condenser serves to condense the moisture (vapor) in the syngas to liquid water, and thereby remove moisture and dry the syngas. As evident from FIG. 2, this water can be used as a source of water for the steam generator, in which case the use of supplemental water can be used if, for example, the feedstock is always dry and/or the operator wishes to maximize syngas production (as opposed to maximizing biochar production).

Whether obtained from the condenser or a supplemental source, the water within the steam generator is heated in a controlled fashion with waste heat drawn from the heat exhanger and/or with supplemental heat from the supplemental heat source. The steam generated is introduced via a control valve to the gasification reactor.

Figure 3:
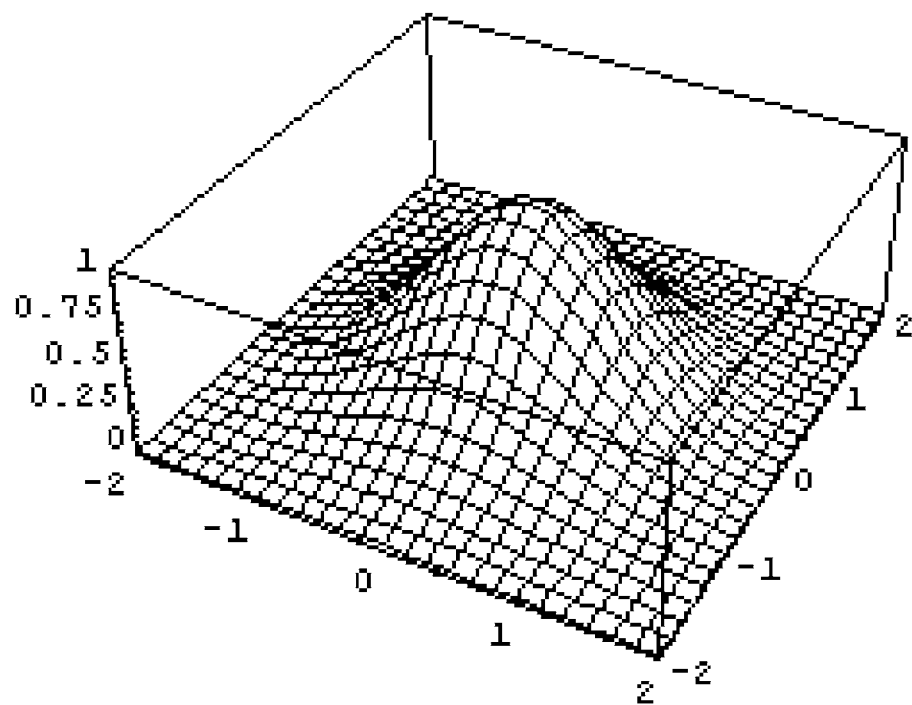
FIG. 3 is a graphical representation illustrating a relationship between two process variables and an output variable.

Inside the reactor, the steam is used to convert at least a portion of the biochar within the reactor to syngas (according to Eq. [1]). In particular, the steam increases the moisture level of the mixture of biomass feedstock, ash and syngas within the gasification reactor, such that carbon in the biomass feedstock and/or ash is converted to a carbon-containing component of syngas. To some extent, steam (moisture) will also become entrained in the syngas, increasing the moisture content of the syngas stream exiting the reactor. In the process of producing the syngas from the biochar, an ash is produced that also exits the reactor. Depending on the moisture content of the biomass entering the gasification reactor and the amount of steam introduced into the reactor, the ash exiting the reactor will contain some amount of biochar, along with mineral ash. If the carbon content of the ash is not measured directly, calibration must be used to indicate to the system controller as to how to modulate the introduction of warm air into the hopper and the introduction of steam into the reactor. For this purpose, a look-up table or a two-dimensional nth order polynomial regression can be used. FIG. 3 is a graphical representation illustrating one possible relationship between two process variables (warm air introduced into the hopper and steam introduced into the reactor) and an output variable (carbon content of the ash).

The algorithm relating biochar output as a function of warm air and steam injection will in general be quite complex. Calibration may require a designed experiment with sufficient interior points to develop an nth order polynomial regression including interaction terms. In general, such a polynomial may have the form (for the case n=3) given in equation [2].

$$C(X,S) = C(H_0) + C_1 X + C_2 S + C_3 X^2 + C_4 S^2 + C_5 X \cdot S + C_6 X^3 + C_7 S^3 + C_8 X^2 \cdot S + C_9 X \cdot S^2 \quad [2]$$

C is the carbon content (biochar) of the ash, $H_0$ is the starting moisture content of $H_2O$ in the biomass feedstock, X is the heat exchanger-derived warm air in terms of heat flow into the hopper, S is the steam injection to the reactor, and the various $C_x$ terms are constants. It may also be possible to build the relation from first principles. A simple example will teach how this can be done in a linear case. Those familiar with these mathematical principles will appreciate that the method can be extended to non-linear relationships between variables.

Figure 4:
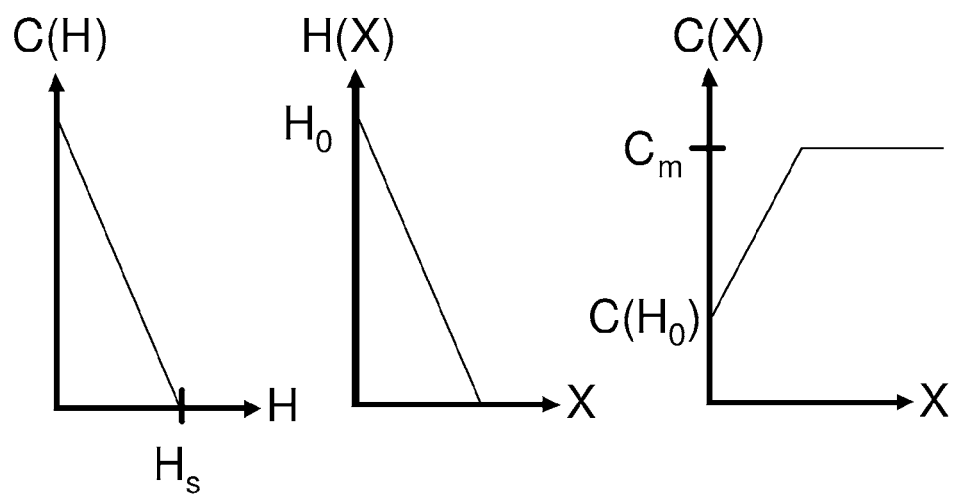
FIG. 4 contains graphs that can be used by the present invention to relate biochar output as a function of warm air and steam injection.

FIG. 4 graphically relates carbon content (C) to heat exchanger air (X) via moisture content (H). The leftmost graph in FIG. 4 represents the biochar carbon content (C) as a function of moisture content (H) in the biomass feedstock. Note the point $H_s$, which is the moisture content at which the stoichiometry of the feedstock is such that all carbon is converted to carbon monoxide and there is no residual steam in the syngas stream arising from feedstock moisture. This stoichiometric point varies by feedstock, and for agricultural residues such as corn stover is, by weight, approximately 15% to 20% of moisture. The center graph in FIG. 4 shows how the quantity of warm air (X) from the heat exchanger causes the moisture content (H) of the feedstock to drop. With sufficient warm air, the moisture content can be driven to zero. Finally, the rightmost graph in FIG. 4 shows the concatenation of the first two graphs, now directly relating biochar carbon content (C) to the quantity of heat exchanger air (X). The point $C(H_0)$ is the biochar content that would be expected with the feedstock at its natural, or in-coming moisture content ($H_0$). The point $C_m$ is the maximum biochar content for feedstock that is completely dry. This maximum amount varies by feedstock, but will typically be in the range of about 20% to 25% of the incoming biomass weight. The mathematics behind FIG. 4 are illustrated in equations [3-5] below, where constants are marked with numeric subscripts. It should be noted that the fraction of ash that is carbon versus mineral will depend both on these relations and the type of feedstock. For example, woody biomass has a typical mineral ash content of about 2%, while certain agricultural residues, such as rice husks, have a typical mineral ash content of about 20% of the incoming biomass weight. This implies that the calibration process described above for FIG. 4. should account for feedstock type.

$$C(H) = C_m - C_1 H \quad 0 \le H \le H_s \quad [3]$$
$$\phantom{C(H)} = 0 \quad\quad\quad\quad H \ge H_s$$
$$H(X) = H_0 - H_1 X \quad H \ge 0 \quad [4]$$
$$C(X) = (C_m - C_1 H_0) + C_1 H_1 X \quad C \le C_m \quad [5]$$

The biochar content as a function of steam injection is similar in form to Eq [4], and is shown in equation [6].

$$C(S) = C(X)) - C_2 S \quad C \ge 0 \quad [6]$$

Equations [5] and [6] can be combined to express the overall relation to two variables with n=1. The resulting equation [7] represents the mathematics behind FIG. 4, and further includes the influence of steam injection.

$$C(X,S) = (C_m - C_1 H_0) + C_1 H_1 X - C_2 S \quad 0 \le C \le C_m \quad [7]$$

The control algorithm to implement the specific relationship (illustrated by FIG. 4 and/or Eq. [7]) has inputs that include the biomass moisture content and the moisture content of the syngas, which further requires the syngas mass flow rate as an input, as discussed above. In practice, direct measurements of the carbon content of the ash is believed to be more desirable. While difficult to automate, calibration of the system of FIG. 2 can include measurements of the syngas water vapor content along with biochar content of the ash to establish a one-to-one link between these two variables. This will have the general form expressed in equation [8], where $W_0$ is the background or residual water vapor content, and W is the water content in the syngas stream.

$$C = W_0 - C_3 W \quad 0 \le C \le C_m \quad [8]$$

Note that once all carbon has been removed from the ash, any additional steam injected into the reactor will be entrained as water vapor in the syngas stream leaving the reactor. This one-to-one relationship can be used as an indication to the algorithm that all the carbon has been removed (C=0), so that steam injection may be reduced or shut off.

A first output of the algorithm is the variable delivery of warm air to the hopper. The temperature and flow rate of the warm air are sensed so that the total heat flux into the hopper is measured. A second output of the algorithm is variable injection of steam into the reactor. In general, the algorithm modulates warm air (X) and steam (S) to adjust the carbon content (C) to the desired value.

Figure 5:
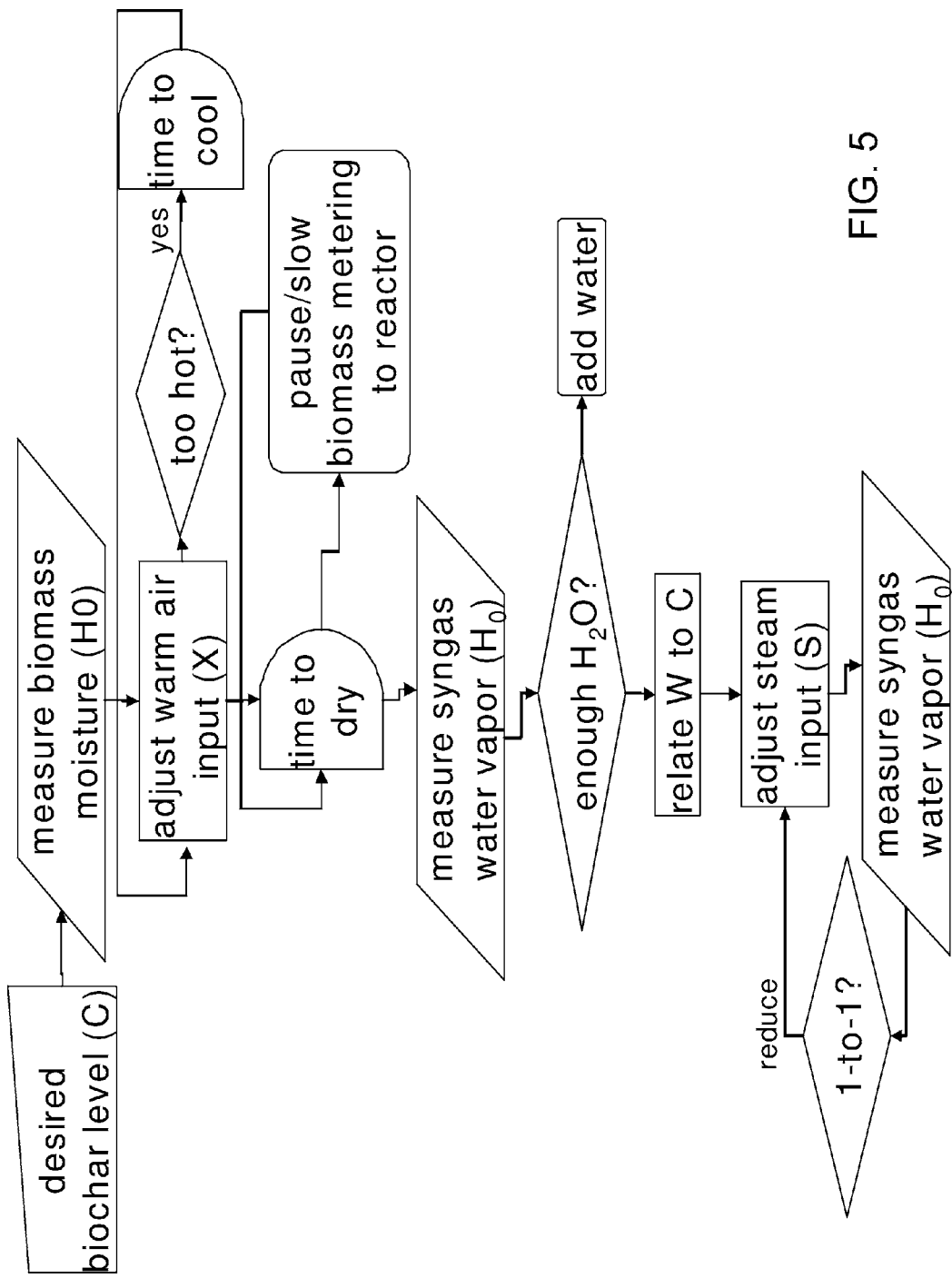
FIG. 5 represents a flow chart of a control strategy suitable for use in operating the system of FIG. 2 in accordance with an embodiment of this invention.

There are many control techniques that are known to be capable of adjusting a controlled value on the basis of two or more inputs. For the particular application of the present invention, constraints preferably imposed on this control strategy include the following: (1) the heat flux of warm air must not be so high that the biomass catches fire (suggesting the use of a temperature sensor within the hopper); (2) a time delay exists between modulations of warm air and biomass moisture content so that the flow rate of biomass to the reactor can be metered to allow sufficient time for the biomass to dry; (3) steam generation requires sufficient water, implying the use of a level sensor and control measures (not shown) for introducing supplemental water into the steam generator; and some fraction of steam injection to the reactor will go directly to the syngas stream, and this depends on reactor geometry and carbon content of ash already extant in the reactor. A flow chart expressing the control strategy described above is represented in FIG. 5.

While the invention has been described in terms of particular embodiments, it is apparent that other forms could be adopted by one skilled in the art. For example, the physical configuration of the system represented in FIG. 2 could differ from that shown, various materials could be used as the feedstock, equipment and sources other than those shown could be used to decrease and increase the moisture contents of the feedstock, and a wide variety of equipment could be used to perform the functions described for the system and process of this invention. Therefore, the scope of the invention is to be limited only by the following claims.

The invention claimed is:

1. A system for producing syngas from biomass materials, the system comprising:
   a receptacle adapted to receive a carbon-containing biomass feedstock;
   a gasification reactor adapted to receive the biomass feedstock from the receptacle and produce a syngas from the biomass feedstock, the gasification reactor comprising an inlet for the biomass feedstock, a syngas outlet for the syngas produced from the biomass feedstock, and an ash outlet for an ash that forms as the syngas is produced from the biomass feedstock; means for decreasing a moisture level of the biomass feedstock prior to the biomass feedstock being received by the gasification reactor from the receptacle so as to increase a carbon content of the ash;
   means for increasing a moisture level of a mixture of the biomass feedstock, the ash and gases while the biomass feedstock and the ash are within the gasification reactor so as to promote conversion of carbon in the biomass feedstock and the ash to a carbon-containing gas component of the syngas and decrease the carbon content of the ash; and
   means for controlling the decreasing and increasing means to selectively regulate the carbon content of the ash to a predetermined level between a level at which carbon is substantially absent from in the ash and a second level at which carbon is present in the ash.

2. The system according to claim 1, wherein the decreasing means comprises means for generating warm air and delivering the warm air to the receptacle.

3. The system according to claim 2, wherein the generating means comprises a heat exchanger adapted to heat air with heat extracted from the syngas.

4. The system according to claim 1, wherein the increasing means comprises means for generating steam and delivering the steam to the gasification reactor.

5. The system according to claim 4, wherein the generating means is adapted to generate steam by heating water extracted from the syngas.

6. The system according to claim 4, wherein the generating means is adapted to generate steam by heating water with heat extracted from the syngas.

7. The system according to claim 1, wherein the controlling means is adapted to use an input corresponding to the moisture level of the biomass feedstock prior to the biomass feedstock being received by the gasification reactor from the receptacle.

8. The system according to claim 1, wherein the controlling means is adapted to use an input corresponding to a water content of the syngas.

9. The system according to claim 1, wherein the controlling means is adapted to use an input corresponding to a mass flow rate of the syngas downstream of the syngas outlet of the gasification reactor.

10. The system according to claim 1, wherein the predetermined level of the carbon content of the ash is based on the amount of at least a second material in the ash.

11. A process of producing the syngas from the biomass feedstock using the system of claim 1, the process comprising:

operating the controlling means to selectively decrease the moisture level of the biomass feedstock prior to the biomass feedstock being received by the gasification reactor from the receptacle and thereby increase the carbon content of the ash or increase the moisture level of the mixture within the gasification reactor and thereby decrease the carbon content of the ash.

12. The process according to claim 11, wherein the controlling means is operated to decrease the carbon content of the ash.

13. The process according to claim 12, wherein carbon is substantially absent in the ash.

14. The process according to claim 12, wherein carbon and silicon are present in the ash at a weight ratio of about 1:1.

15. The process according to claim 14, the process further comprising obtaining elemental silicon from the ash.

16. The process according to claim 11, wherein the controlling means is operated to increase the carbon content of the ash to the second level.

17. The process according to claim 16, wherein the second level is at least 25 weight percent of the ash.

18. The process according to claim 16, wherein the second level is at least 50 weight percent of the ash.

* * * * *